United States Patent
Critoph (10) Patent No.: US 6,629,432 B1
(45) Date of Patent: Oct. 7, 2003

(54) THERMAL REGENERATIVE SORPTION DEVICE

(75) Inventor: Robert Edward Critoph, Coventry (GB)

(73) Assignee: University of Warwick, West Midlands (GB)

(*) Notice: Subject to any disclaimer, the term of this patent is extended or adjusted under 35 U.S.C. 154(b) by 0 days.

(21) Appl. No.: 10/088,803

(22) PCT Filed: Sep. 12, 2000

(86) PCT No.: PCT/GB00/03497

§ 371 (c)(1),
(2), (4) Date: Mar. 21, 2002

(87) PCT Pub. No.: WO01/22010

PCT Pub. Date: Mar. 29, 2001

(30) Foreign Application Priority Data

Sep. 21, 1999 (GB) .............................................. 9922339

(51) Int. Cl.[7] ........................... F25B 17/08; F25B 17/02
(52) U.S. Cl. .......................................... 62/480; 62/478
(58) Field of Search .......................... 62/480, 478, 476, 62/101, 106, 477; 96/125, 130, 154; 165/104.12, 104.21, 104.22

(56) References Cited

U.S. PATENT DOCUMENTS

| | | | |
|---|---|---|---|
| 4,478,057 A | 10/1984 | Lotz | |
| 4,660,629 A | * 4/1987 | Maier-Laxhuber et al. | ...... 165/104.12 |
| 5,279,359 A | 1/1994 | Erickson | |
| 5,408,847 A | 4/1995 | Erickson | |
| 5,431,716 A | 7/1995 | Ebbeson | |
| 5,503,222 A | * 4/1996 | Dunne | .................... 165/104.12 |
| 5,941,093 A | 8/1999 | Bengt | |

FOREIGN PATENT DOCUMENTS

DE      3514495 A1      10/1986

* cited by examiner

*Primary Examiner*—Chen Wen Jiang
(74) *Attorney, Agent, or Firm*—Drinker Biddle & Reath LLP (57) ABSTRACT

The thermal regenerative compressive device 20 has a plurality of sorbent vessels 10 arranged circumferentially about a rotational axis X partly within a toroidal conduit 21. A heat carrier fluid flows from an inlet 22 of the conduit to the outlet 23 in counterflow with respect to the rotational movement of the sorbent vessels 10. Separate fluid channels 29, 30 encase the evaporation/condensation zones 15 of the vessels 10 to enable transfer of heat between the vessels 10 and the fluid flowing in channels 29 and 30. With the compressive device 20 heat is regenerated in a particularly simple and convenient manner. As a result the compressive device is capable of achieving greater efficiencies than existing adsorption devices.

22 Claims, 6 Drawing Sheets

FIGURE 1

PRIOR ART

FIGURE 13

THERMAL REGENERATIVE SORPTION DEVICE

FIELD OF THE INVENTION

The present invention relates to a thermal regenerative compressive device and particularly to a compressive device that employs an adsorption cycle. Adsorption cycles can be used in heat-driven refrigerators, air conditioning and in heat pumps in which the energy source is a burning fuel or waste heat.

BACKGROUND OF THE INVENTION

The conventional vapour compression cycle demands a mechanical work input that is normally provided via an electric motor. In comparison with such conventional vapour compression machines, high efficiency adsorption machines can provide a reduction in running costs, the use of primary energy for cooling or heating and an associated reduction in $CO_2$ emissions. This latter advantage is particularly important in the light of growing concerns over the 'greenhouse effect'. Even larger savings can be made where the waste heat is used as the driving energy in a regenerative cycle.

Adsorption or absorption refrigeration and heat pump cycles rely on the adsorption or absorption of a refrigerant gas, such as ammonia, into a solid adsorbent or solid/liquid absorbent at low pressure and subsequent desorption by heating. The sorbent acts as a 'chemical compressor' driven by heat. A brief description of a simple adsorption cycle is given below to assist in an understanding of this cycle that is central to the operation of the compressive device of the present invention.

Figure 1:
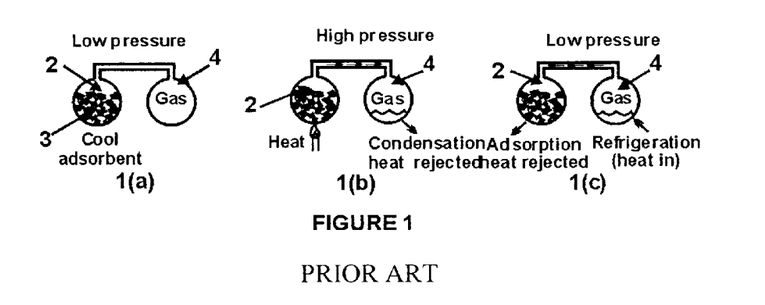
FIGS. 1a, 1b and 1c show schematically the basic adsorption cycle.

In its simplest form an adsorption refrigerator consists of two linked vessels 2,4. The first vessel 2 contains adsorbent 3 and both vessels contain refrigerant as shown in FIG. 1. Initially, as shown in FIG. 1a the whole assembly is at low pressure and temperature. The adsorbent 3 contains a large concentration of refrigerant within it and the second vessel 4 contains refrigerant gas. The adsorbent vessel 2, otherwise known as the generator, is then heated driving out the refrigerant and raising the system pressure. The desorbed refrigerant condenses as a liquid in the second vessel 4 and the process rejects heat to the environment surrounding the vessel (FIG. 1b). The heat rejected by the second vessel 4 is part of the useful heat output of a heat pump. The generator 2 is then cooled back to ambient temperature re-adsorbing the refrigerant and reducing the system pressure. The reduced pressure above the liquid in the second vessel 4 causes the liquid to boil (FIG. 1c). Heat is absorbed whilst the liquid boils, producing a cooling/refrigeration effect to the environment surrounding the second vessel 4. The heat drawn from the generator 2 forms the other part of the useful heat output of a heat pump.

It should be noted that the cycle described above is discontinuous since useful cooling only occurs for half of the cycle. However, two such systems operated out of phase could theoretically provide continuous cooling. This basic arrangement of a heat-driven adsorbent compressive device has a comparatively low Coefficient Of Performance (Refrigeration COP=Cooling/Heat Input and Heat Pump COP=Heat Output/Heat Input). Also, as the thermal conductivity of the adsorbent bed in the generator 2 is generally poor, the time taken for a cycle could be an hour or more and the cooling power per mass of adsorbent could be less than 100 W/kg. Improved heat transfer can reduce this cycle time to a few minutes which in turn increases the power density of the adsorbent to the order of 1 kW/kg. Where two or more adsorbent beds are used out of phase with one another, heat from one of the beds can be re-used to pre-heat another of the adsorbent beds, i.e. the heat can be 'regenerated'. This can improve the COP as the heat rejected by one adsorbent bed can provide a large part of the heat required for desorption in another bed.

Despite considerable research in this area, however, only two established types of heat driven air conditioners are currently on the market. Lithium bromide—water air conditioners can be very efficient but are unable to provide cooling temperatures <0° C. and only become viable in >100 kW sizes. Also, such air conditioners can only be used in combination with a cooling tower. Smaller (15 kW) ammonia—water chillers have very poor efficiency.

In U.S. Pat. No. 5,503,222 a carousel heat exchange is described in which a plurality of heater tubes are arranged radially around a rotational axis. Each heater tube contains a solid adsorbent and a refrigerant and is divided into two zones. Radially extending baffles define a series of axially extending temperate sections through which a heat carrier fluid, such as air, flows across the heater tubes in an axial direction. Rotation of the heat exchanger results in the heater tubes crossing each of the temperate sections in turn.

U.S. Pat. No. 4,660,629 describes a similar heat-driven adsorption device again consisting of a plurality of adsorption chambers arranged radially about a rotational axis and intersecting an axial flow of heat carrier fluid.

The heat-driven adsorption devices described in the above mentioned documents have complex structures involving a plurality of separated axial heat carrier fluid streams across which the radially arranged adsorption containers pass. That is to say the heat carrier fluid is in cross-flow with respect to the movement of the adsorption containers. Also, the structure of the adsorption devices described in the documents referred to above prevents or limits the opportunity to regenerate heat and so establishes an upper limit with regard to the efficiency of the devices.

SUMMARY OF THE INVENTION

The present invention, on the other hand, seeks to provide a compressive device, that employs an adsorption cycle, that enables regeneration of heat in a simple and effective manner and so is capable of achieving greater efficiencies than previous adsorption devices.

The present invention provides a compressive device comprising: a plurality of sorbent vessels each vessel containing a sorbent material and a sorbate fluid; one or more fluid conduits in which at least a portion of each of the plurality of sorbent vessels is located and in which a heat carrier fluid flows, the conduit having an inlet and an outlet; and driving means for causing relative cyclical movement of the sorbent vessels with respect to the inlet of the conduit such that the heater carrier fluid at the inlet is in counterflow with respect to the sorbent vessels.

In a preferred embodiment, the conduit is stationary and the driving means is connected to the plurality of sorbent vessels. The conduit may be a cylindrical annulus within which the sorbent vessels move with the axis of the sorbent vessels aligned with the central axis of the cylinder. In this way the heat carrier fluid is in counterflow with respect to the rotational movement of the sorbent vessels throughout the conduit. The sorbent vessels may be mounted about an edge region of a rotating disc with the rotating disc forming a sliding fluid seal with respect to the conduit.

Ideally, a heating device for heating the heat carrier fluid is provided at an intermediate position between the inlet and the outlet to the conduit. The heating device may be positioned away from the conduit with a passageway fluidly connecting the conduit to the heating device. Alternatively, the heating device may be positioned so as to provide direct heating of the carrier fluid within the conduit or the heating device may consist of a valve for the introduction of a heated fluid, additional to the heat carrier fluid, into the conduit.

Moreover, a seal is preferably provided in the conduit between the inlet and the outlet to direct the flow of the heat carrier fluid in a selected path through the conduit. The fluid seal may consist of a plurality of vanes connected to a rotating axle wherein the end of each vane, distant from the axle, forms a sliding fluid seal with respect the conduit. Alternatively, the fluid seal may be in the form of a constriction in the conduit.

A plurality of heating/cooling channels may be provided and each of the sorbent vessels has a second portion, distant from the first portion, said driving means causing relative cyclical movement of the second portions of the sorbent vessels with respect to the heating/cooling channels. Preferably, the heating/cooling channels are arranged to produce a flow of fluid over the second portions of each of the sorbent vessels.

With the present invention a continuous and steady output of heating/cooling can be achieved. Also, with appropriate adsorbent material a high power density in excess of 1 kW cooling/kg of adsorbent can be achieved and a system volume of only 0.2 m$^3$ for a 10 kW chiller. Moreover, the absence of specialist ammonia valves, pumps and control equipment greatly simplifies the construction and maintenance of the compressive device and reduces the overall cost of the device. For a gas-fired air conditioning system it is believed that a COP of 0.95 is achievable with the present invention due to the regenerative nature of the cycle employed.

Preferably the absorbent material is an active carbon. However, alternative material may be used such as zeolites, silica gels, metal hydrides, chemical absorbents such as calcium chloride and liquid absorbents such as water or lithium bromide.

The compressive device of the present invention may be used in direct air-conditioning or refrigeration. The present invention may additionally be employed in the chilling of liquids or in ice making. Indeed, the compressive device of the present invention is suitable in all cases where heating/cooling is required including air conditioning, industrial refrigeration, in heat pumps or as a thermal transformer.

Although reference is generally made herein to solid adsorbents it is to be understood that the present invention may alternatively employ fluid absorbents such as water with ammonia as the refrigerant, for example.

BRIEF DESCRIPTION OF THE DRAWINGS

Embodiments of the present invention will now be described by way of example, with reference to the accompanying drawings, in which.

DETAILED DESCRIPTION OF THE INVENTION

Figure 2:
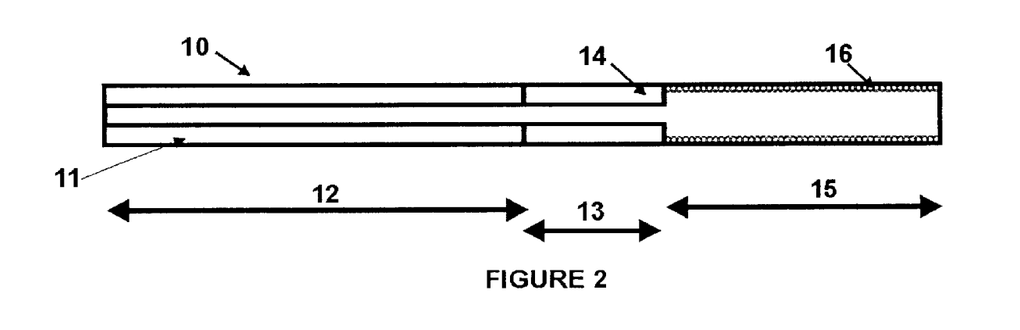
FIG. 2 is a schematic cross-section of a sorbent vessel in accordance with the present invention.

The sorbent vessel 10 shown in FIG. 2 consists of a tube with a length and diameter of around 1 m and 10 mm respectively. The tube is preferably made of aluminium or stainless steel with a wall thickness of around 0.5 mm for good thermal conduction. The vessel 10 contains a sorbate fluid such as a refrigerant, preferably ammonia. At a first end region 12 of the vessel 10, called the sorption zone, a layer of sorbent material 11 lines the inner surface of the vessel wall to a thickness of around 2 mm. Preferably the sorbent material is monolithic carbon, however alternative sorbent materials may be employed as will be discussed in greater detail later. Although the ratio of dimensions set out above are preferred, alterative sizes and shapes for the sorbent vessel are envisaged.

Adjacent the sorption zone 12 there is a central, adiabatic zone 13 in which an inert material 14 lines the vessel wall and acts as chemically inert plug. This plug restricts the 'dead volume' of the vessel and might alternatively be achieved by reducing the diameter of the vessel in this zone. Preferably, the inert material has poor thermal conductivity and thus restricts conduction or transport of heat from one end of the vessel to the other. The inert material may consist of a ceramic or metallic material. In some designs of the adsorbent vessel 10 this central zone 13 maybe omitted and/or the lining of inert material may be omitted.

At the opposite end of the vessel to the sorption zone is a second end region 15, otherwise identified as an evaporation/condensation zone. The evaporation/condensation zone 15 contains wire gauze 16 on its inner wall that ensures a capillary action to retain condensed refrigerant close to the wall of the vessel 10. The wire gauze 16 may be replaced by a sorbent material having different sorbent characteristics to that of the sorbent material in the sorption zone 12. Alternatively, the wire gauze 16 may be omitted if zone 15 is positioned below zone 12. Also, the inner wall of the vessel in the evaporation/condensation zone 15 may be structured to provide nucleation sites for condensation. For example, the wall may be grooved or sintered.

Figure 3:
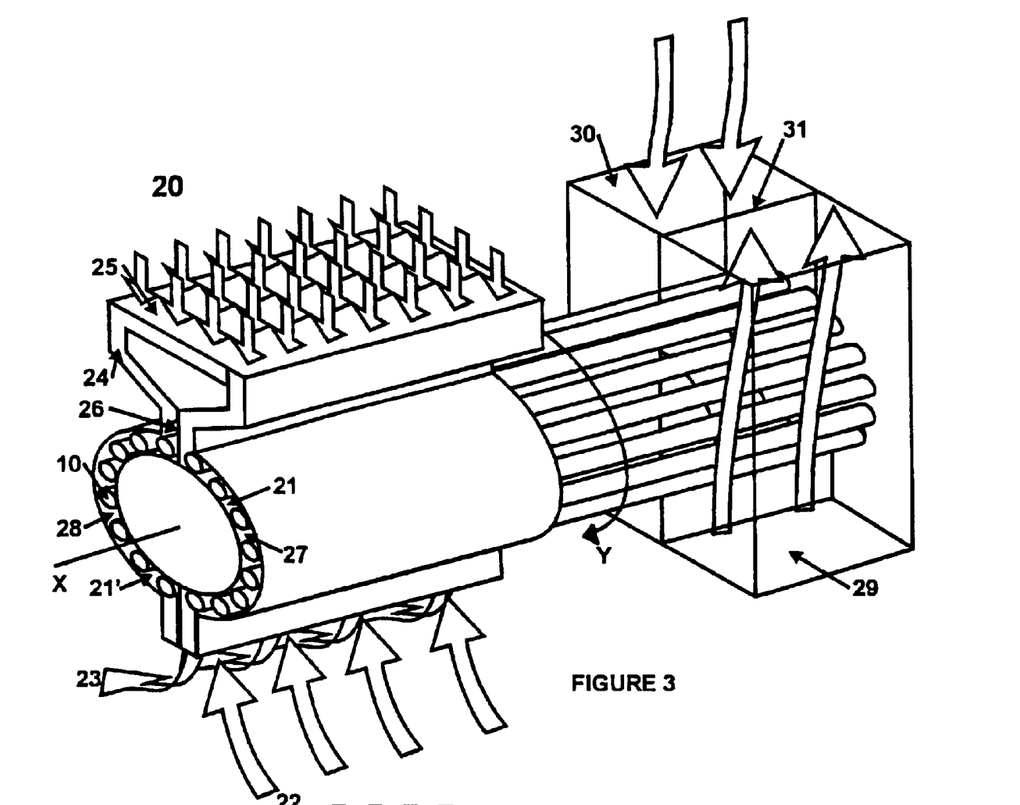
FIG. 3 is a schematic perspective view of a first embodiment of a compressive device in accordance with the present invention.

Turning now to FIG. 3 a compressive device 20 is represented containing a plurality of the sorbent vessels 10 of FIG. 2. Although only 16 sorbent vessels are shown in FIG. 3, typically 30 or more vessels may be used with each vessel operating slightly out of phase with its neighbour. The sorbent vessels 10 are arranged on the circumference of a circle about a rotational axis X with the length of each of the vessels 10 substantially parallel to the rotational axis X.

The vessels 10 are enclosed within a torus-shaped fluid conduit 21 that is common to all of the sorbent vessels and provides a path for a carrier fluid to flow substantially circumferentially about the rotational axis X. The torus-shaped fluid conduit 21 is defined by the walls of concentric cylinders between which the sorbent vessels move in a substantially circular path about rotational axis X, clockwise in FIG. 3. The radial separation of the concentric cylinders, which corresponds to the width of the conduit, is preferably only slightly greater than the diameter of the sorbent vessels 10. For example the width of the conduit 21 may be approximately 15 mm. The breadth of the fluid conduit 21 substantially corresponds to the length of the sorption zone 12 of the sorbent vessels 10 and so generally covers that region of the sorbent vessels where the adsorption of refrigerant takes place. Although only one conduit is shown in the Figures, the conduit may be divided into a plurality of separate conduits at different radii or stacked one against the other in the axial direction. Each conduit defines a path for the circumferential circulation of a heat carrier fluid and the sorbent vessels 10 extend through all of the conduits and are moving in counterflow with respect to the flow of the heat carrier fluid in the conduits.

Figure 6:
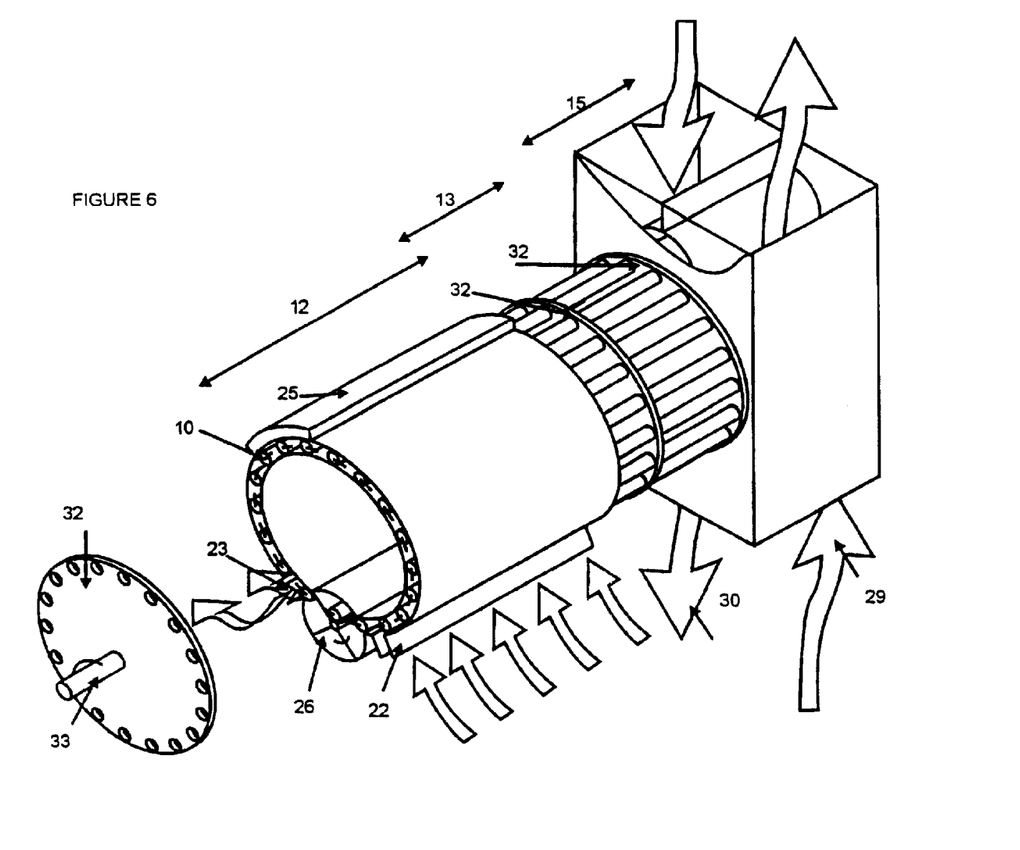
FIG. 6 is a schematic diagram of a second embodiment of a compressive device in accordance with the present invention.

The free end of the sorption zone 12 of each vessel 10 is attached to the facing rim of a baffle (not shown in FIG. 3, see reference numeral 32 in FIG. 6). The baffle is used to support the vessels and to control the movement of the vessels 10 as they travel through the stationary conduit 21. The baffle is also used to seal against the end of the conduit 21' so as to restrict escape of fluid from the conduit. The baffle rotates on an axle 33 of FIG. 6 with the sorbent vessels and forms a sliding seal with respect to the end 21' of the conduit. A similar baffle 32 is also provided, opposite to the end 21' of the conduit, between the sorption zone 12 and the adiabatic zone 13. The axle 33 provides the motive force for the rotation of the sorbent vessels at speeds of around 1 rpm, for example.

In FIG. 3 the fluid conduit 21 has an inlet 22 entering radially inwards to the main circumferential path of the conduit 21 and an outlet 23 is located adjacent the inlet 22 and extends, substantially parallel to the inlet 22, radially outwards from the main path of the conduit. The heat carrier fluid flows from the inlet 22 to the outlet 23 and as shown in the Figures is in counterflow with respect to the rotational movement of the vessels 10 through the conduit.

At a position substantially (for example somewhere between 90° and 180°) diametrically opposite to the inlet 22 and outlet 23, the conduit 21 has a branch duct 24 that extends outwardly from the circumference of the annular extrusion shaped conduit to a heated section 25, distant from the sorbent vessels 10, and then returns to the circumferential path of the conduit to the outlet 23 from the heated section 25. In this way the path of the carrier fluid is diverted away from the circumferential path at the branch duct 24 and is later returned to the same circumferential path after the branch duct. The branch duct is shown located opposite the inlet 22 and outlet 23, however alternative intermediate positions between the inlet and outlet may be adopted. The heated section 25 may consist of a conventional heat exchanger or may include a section exposed to direct heat through the combustion of a gas or other fuel. Alternative heating may be achieved using a renewable resource such as solar heat. Where the compressive device is used in combination with an internal combustion engine the heated section may use the heat of the exhaust gases from the engine. With the exception of the branch duct 24, the carrier fluid within the conduit generally circulates about the rotational axis X, counterclockwise in FIG. 3. Thus, the sorbent vessels 10 and the carrier fluid are in counter-flow with respect to one another.

Figure 7:
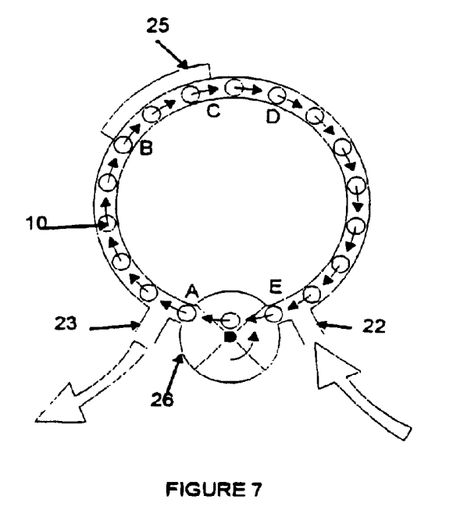
FIGS. 7, 8, 9 and 10 are more detailed diagrams of alternative fluid seals for use with the compressive device.
Figure 8:
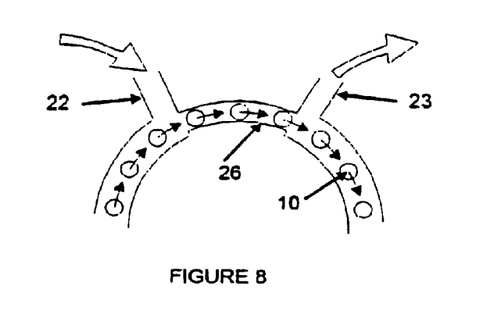
Figure 9:
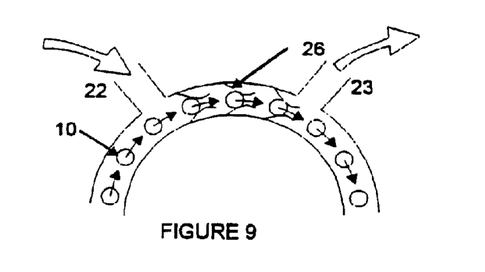
Figure 10:
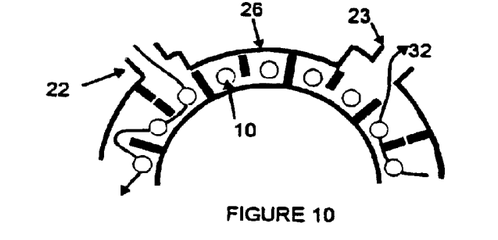

A fluid seal 26 is provided within the conduit 21 extending the breadth of the conduit and in FIG. 3 is located between the two points where the branch duct 24 joins the fluid conduit 21. The fluid seal permits the passage of the sorbent vessels but restricts escape of the carrier fluid from the section of the conduit 27 before the branch duct 24 to the section of the conduit 28 after the branch duct. The fluid seal 26 may be in the form of an X-shaped member mounted on an axle lying parallel to the rotational axis X, as shown in FIG. 7 where the seal 26 is located between the inlet 22 and the outlet 23. The X-shaped member 26 is sized so as to be capable of rotation within the fluid conduit whilst maintaining sliding seals between the individual vanes of the X-shaped member and the walls of the conduit. It will of course be appreciated that the fluid seal could alternatively be Y-shaped. Other alternative designs of seal that permit the passage of the sorbent vessels whilst restricting the direct flow of fluid from the first section 27 of the conduit to the second section 28 are shown in FIGS. 8 to 10. Thus, in FIG. 8 the fluid seal is formed by means of a constriction in the width of the conduit such that the sorbent vessels 10 form a sliding fluid seal with respect to the walls of the conduit. Such a design is best suited to a compressive device where the surface of the vessels is smooth. In FIG. 9 flexible or spring loaded flaps are mounted in the walls of the conduit and slidingly engage with each of the sorbent vessels in turn. In FIG. 10 barriers are located between each of the sorbent vessels that move with the vessels creating a labyrinthine passage for the carrier fluid through the conduit 21. Here too the width of the conduit is narrowed between the inlet 22 and outlet 23 so that the barriers slidingly engage the walls of the conduit forming a fluid seal therewith. Such an arrangement ensures a fluid seal even where vessels are used that have fins on their outer surface.

In FIG. 3 the fluid seal ensures that the carrier fluid is forced to flow from the first section 27 of the conduit through the branch duct 24 to the second section 28 of the conduit. A similar fluid seal is used to restrict the flow of carrier fluid directly from the inlet 22 to the outlet 23 without first flowing through the conduit 21. In the case of the seal of FIG. 7, the arms of the fluid seal may also be used to urge the sorbent vessels forward in the clockwise direction within the conduit.

Figure 11:
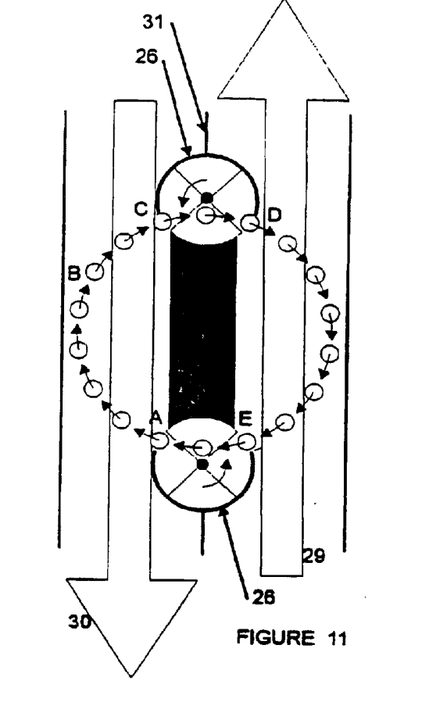
FIG. 11 is a more detailed diagram of fluid seals used in the evaporator/condenser channels of the compressive device.

At the opposite end of the compression device two fluid channels 29, 30 are provided. The two fluid channels may be similar in construction to the fluid conduit 21 but with each channel having an outlet diametrically opposite to its inlet. Alternatively, a less restrictive structure for the two channels 29, 30 may be provided in the form of a pipe being generally rectangular in cross-section and having a divider 31 splitting the pipe into two halves as shown in FIG. 11. The fluid channels 29,30 preferably extend over the evaporation/condensation zones 15 of the vessels 10. Alternatively, the channels 29, 30 may extend so as to partly or fully cover the central or adiabatic zone 13 of the vessels 10. The divider 31 is arranged to seal against flow of fluid from one fluid channel to the other whilst still permitting the rotational passage of the sorbent vessels using suitable fluid seals. Baffles 32 are again used to close the ends of the channels and to restrict axial escape of fluid. The outermost baffle may additionally be used to support the ends of the vessels. Heat pipes, heat exchangers or thermosyphons may be employed to transfer heat between the evaporator/condenser channels 29, 30 and other external fluid streams such as in a domestic hot water or radiator system.

Figure 4:
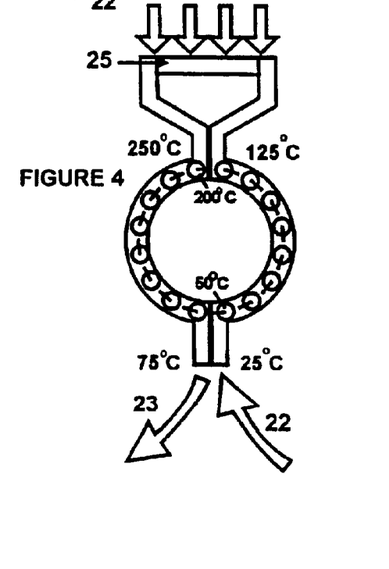
FIG. 4 is a diagram of the temperature distribution in the sorption zone of the compression device.
Figure 5:
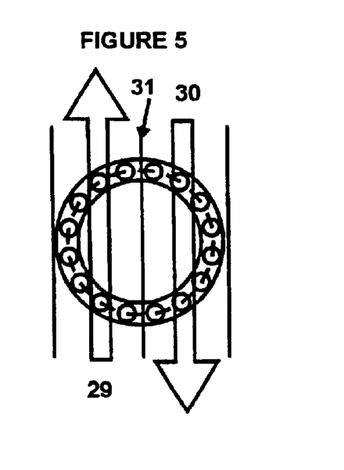
FIG. 5 is a diagram of the heat transfer in the evaporation/condensation zone of the compressive device.

The direction of rotation Y of the sorbent vessels is shown in FIG. 3 and the counterflow direction of the carrier fluid through the fluid conduit 21 is shown in FIG. 4. In FIG. 5 the flow of fluid, such as air, through the fluid channels 29 and 30 is shown. For the sake of clarity, FIG. 5 is drawn as viewed from the end of the compressive device and so the direction of rotation of the sorbent vessels is opposite to that shown in FIGS. 3 and 4. As can been see from FIG. 3 the flow of fluid in the channels 29, 30 is also counter to the direction of movement of the sorbent vessels and is opposite to the thermal gradient of the sorbent vessels as will be described in greater detail below. An explanation of the operation of the compression device will now be provided with reference to FIGS. 4 and 5.

Considering a single sorbent vessel that is initially cold and commencing the cycle at the outlet 23 of the sorption zone 21 and with the sorbent in the form of monolithic carbon containing approximately 25% ammonia, the sorption zone 21 is heated which raises the temperature of the carbon and increases the pressure within the vessel which in turn results in ammonia being desorbed. The ammonia condenses in the evaporation/condensation zone 15, rejecting heat to its surroundings. The film of condensate is held close to the wall of the vessel by the capillary action of the wire gauze 16 which also maintains good heat transfer as the thickness of the condensate increases. The gauze 16 performs a similar action to that of a heat pipe wick. Preferably, the length of the evaporation/condensation zone 15 is sufficient to enable the carbon to desorb between 10 and 15% by mass of ammonia and the resultant condensate is held by the wire gauze 16. The gauze 16 may be omitted if zone 15 is below zone 12, preventing liquid adsorbate being returned to zone 12 by the action of gravity. The boiling heat transfer is enhanced by the gauze, but the gauze is not essential.

The sorption zone 12 is now cooled back towards ambient temperature so that the ammonia is adsorbed back into the monolithic carbon 11. This reduces the pressure within the vessel 10 and results in the liquid ammonia boiling in the evaporation/condensation zone 15. This draws heat from the surroundings of the evaporation/condensation zone and cools the surroundings to below ambient temperature.

Considering the device as shown in FIG. 3, each of the sorbent vessels 10 is slightly out of phase with respect to the cycle of the adjacent vessels. The vessels are rotated about rotational axis X within the fluid conduit 21 in a clockwise direction as shown in FIG. 3. The carrier fluid is in counterflow with respect to the rotation of the sorbent vessels and thus flows in a counterclockwise direction in FIG. 3.

Turning now to the flow of carrier fluid through the conduit 21, the carrier fluid enters through the inlet 22 at ambient temperature and encounters the sorbent vessels 10 moving in counter-flow. The ambient air cools the sorbent vessels enabling them to adsorb refrigerant and creating a cooling effect in the evaporator channel 29. The flow rate of carrier fluid is chosen so that its thermal capacity is well matched to the more massive but slower moving sorbent vessels. The carrier fluid increases in temperature as it progresses in a counterclockwise direction further round the first section 27 of the conduit. Similarly the temperature of the sorbent vessels increases the further the vessels 10 are from the inlet 22.

Adjacent the branch duct 24 at the end of the first section 27, the sorbent vessels may have heated the carrier fluid to temperatures in the region of 125° with the adsorbate in the vessels at around 200°. The pre-heated carrier fluid then flows along the branch duct 24 to the heated section 25 where the carrier fluid is heated to temperatures in the region of 250°, for example. The high temperature carrier fluid is re-introduced to the sorbent vessels in the second section 28 of the conduit 21. The heated carrier fluid heats the adsorbate in the vessels from ambient or low temperatures such as 50° to temperatures of around 200° C. This heating of the vessels causing desorption of the refrigerant a corresponding condensation in the evaporation/condensation zone 15. As the refrigerant condenses, the fluid flowing in the condenser channel 30 is heated.

For the sake of clarity, the temperatures quoted above are illustrative only and are not to be considered restrictive.

Turning now to FIG. 6 a similar but alternative compressive device is shown with like elements identified by like reference numerals. With this compressive device the branch duct is omitted and instead heat is applied directly to the carrier fluid in the conduit 21 by a heater 25. In a further alternative a high temperature stream of fluid may be added to the carrier fluid at this point. In all other respects the compressive device is the same as that shown in FIG. 3.

Figure 12:
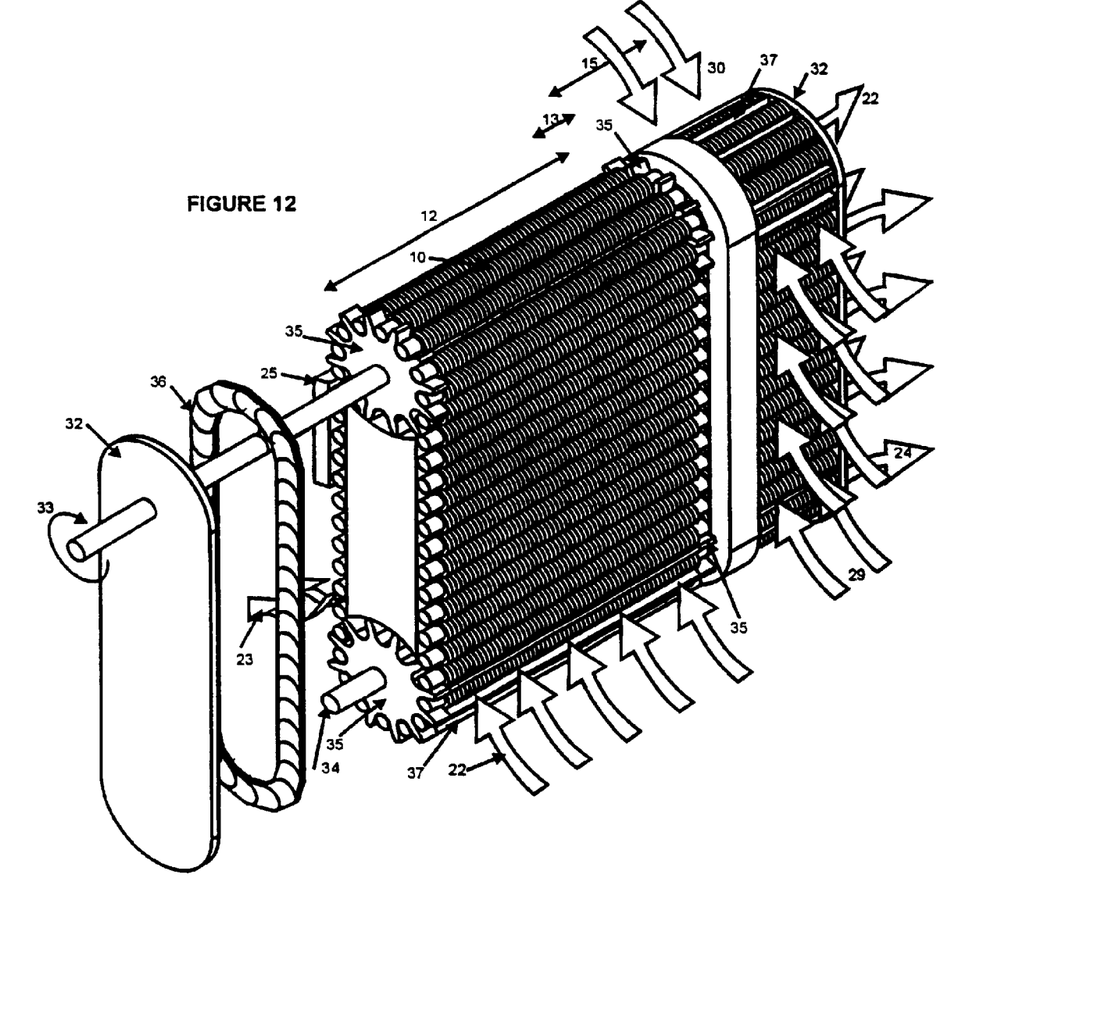
FIG. 12 is a schematic diagram of a third embodiment of a compressive device in accordance with the present invention.

In FIG. 12 the compressive device is generally rectangular with two axles 33, 34 that drive the sorbent vessels around a cyclical path. The outer casing is omitted from this Figure. Each axle is connected to a pair of sprocket wheels 35, that engage with opposing free ends of the vessels 10 to drive the movement of the vessels about the conduit 21. A continuous chain of links 36 controls the movement of the vessels with each link 36 being secured to an end of a respective vessel. Each link 36 is secured to its neighbouring links so as to permit relative rotational movement and enables the chain to guide the vessels in their cyclical path. The chain also provides the fluid seal to prevent an outward axial flow of carrier fluid from the conduit 21. The vanes 37 of a seal are shown adjacent the lower sprocket and between the vessels uppermost in the evaporator/condenser channels in FIG. 12. It will be seen from FIG. 12 that the heater 25 is mounted directly on the outer wall of the conduit 21 beyond, in a counterclockwise direction, a position diametrically opposite the inlet and outlet 22, 23. Thus, the axial edge of the heater 25 stops short of the sprocket 35 between the evaporation and condensation channels such that the sorbent zone 12 of each of the vessels is heated only whilst the evaporation/condensation zone 15 remains in channel 30.

Figure 13:
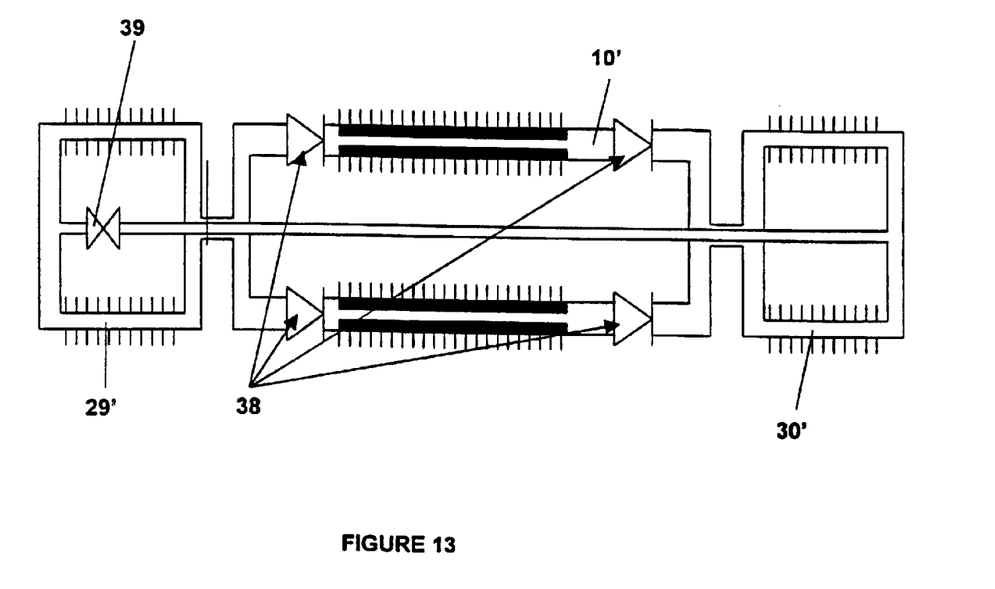
FIG. 13 is a schematic diagram of a fourth embodiment of a compressive device in accordance with the present invention.

In FIG. 13, instead of each vessel 10 containing its own supply of refrigerant, all of the vessels 10' are interconnected via check is valves 38. Thus, the vessels 10' are of a somewhat different construction to the vessels of the earlier figures as they only consist of a sorption zone 12 or generator section. Opposing ends of the vessels 10' are in fluid communication with a condenser 30' and an evaporator 29'. Although not illustrated, the device of FIG. 13 has a series of vessels 10' arranged circumferentially in a conduit (only two vessels are shown in FIG. 13, in practice as many as thirty-two or more separate vessels may be employed). As for the earlier embodiments, a heat carrier fluid is supplied to the conduit so that it flows counter to the direction of rotation of the vessels within the conduit to heat and cool the sorbent in the vessels 10'.

In use, when the internal pressure in a vessel 10' rises above the pressure in the condenser, a check valve opens allowing refrigerant to flow from the vessel 10' to the condenser 30', which is common to all the vessels 10'. The refrigerant 10' condenses in the tubes of the condenser which are cooled by an external fluid flow. The refrigerant liquid then flows through a pressure reducing expansion valve 39, of the type used in conventional vapour compression refrigeration systems, and enters the evaporator 29', which is common to all the vessels 10'. The refrigerant boils within the evaporator 29', drawing heat from the external fluid flow. The refrigerant gas then flows back via the check valves to whichever vessels 10' have a lower pressure than the evaporator.

As the vessels 10' no longer have individual evaporator/condensation zones, the repeated heating and cooling of the vessels in these zones, which is inherent in the earlier embodiments and, which is inefficient, is avoided. Instead, the refrigerant is caused to flow to a separate condenser and a separate evaporator which also rotate with the vessels. This construction affords greater efficiencies as the condenser and evaporator are at constant temperatures and at different locations. As indicated in FIG. 13, fins can be introduced to the external walls of the vessels 10', the condenser 30' and the evaporator 29' to further improve thermal conduction.

With the compressive devices described above the inputs and outputs of heat are steady and continuous. Also, there is highly regenerative heating of the sorbent vessels as the heat of adsorption from one tube in the first section 27 of the conduit is used to desorb another in the second section 28 of the conduit. This leads to improved COPs. Furthermore, the device is simple in construction and requires no complex refrigerant valves and pumps which in turn reduces manufacturing costs. An added benefit of this device is that in the event of a failure of the one of the sorbent vessels only a very small amount of refrigerant would be released thus limiting the potential environmental hazard of the device.

In order to maximise the transfer of heat to and from the sorbent vessels, the outer surface of the sorbent vessels may be structured to increase the surface area, for example by the addition of fins that may be aligned axially or concentrically with respect to the vessel, see for example FIGS. 12 and 13. Moderate tube finning, to increase the surface area by a factor of four, would be of benefit. Also, it is envisaged that as an alternative to the current exemplified flow of carrier fluid, the carrier fluid may flow radially through stationery slots to define a labyrinthine path along the conduit whilst still maintaining a general flow direction that is counter to the thermal gradient of the sorbent vessels.

Suitable adsorbates include active carbons, zeolites, silica gels, metal hydrides and chemical absorbents such as calcium chloride. Liquid sorbents such as water or lithium bromide may alternatively be used in which case suitable means must be employed to prevent the transport of liquid absorbent or liquid absorbate between zones 12 and 15. For solid absorbents the granular material may be consolidated and/or bound with a binder so as to provide good thermal contact with the vessel wall and allow provision for the sorbate gas to travel freely through a channel axially along the vessel. Suitable refrigerants include ammonia, water, conventional refrigerants and carbon dioxide. The carrier fluid in the conduit 21 and the fluid in channels 29 and 30 may be any suitable fluid including but not limited to air, combustion gases, heat transfer oils, water or glycol mixes.

Although the compressive device described above has the sorbent vessels moving through a stationary conduit, in an alternative design the sorbent vessels may be held stationery with the conduit rotating relative to the vessels and/or only the carrier fluid whilst still maintaining the flow of the fluid in the same direction as the increasing temperature gradient of the sorbent vessels between the first and second sections of the conduit. That is to say, the direction of flow of the carrier fluid is from the cooler vessels in the first section of the conduit to the hotter vessels in the second section of the conduit. Thus, using the inlet 22 as a frame of reference, the heat carrier fluid is in counterflow with respect to the sorbent vessels, whether it is the vessels that are moving or the conduit. In a further alternative the sorbent vessels may be secured to the inner wall of the conduit and rotate with the inner wall of the conduit whilst the outer wall remains stationary. In all cases it is the relative movement of the vessels with respect to the inlet (or outlet) of the conduit that is required.

However, as heat regeneration is not an issue with respect to the evaporation/condensation channels 29, 30, the flow of fluid in the channels with respect to the vessels can be in any direction for example radial, axial or tangential. Also, it is not essential for the fluid in the channels 29, 30 to flow counter to the direction of rotation of the vessels 10.

It is not essential that the compressive device be generally cylindrical in construction. As shown in FIG. 12 alternative shapes may be employed whilst still maintaining the relative flow of carrier fluid with respect to the temperature gradient of the sorbent vessels. Also, although the compressive device is shown with its rotational axis generally horizontal in some embodiments it would be preferable for the compressive device to be arranged with its rotational axis aligned generally vertical with the evaporator/condenser zone 15 beneath the sorbent zone.

Also, although reference has been made throughout to the provision of fluid seals, such seals need not be perfect. Some leakage of fluid may be allowed across the seals without a significant reduction in the performance and efficiency of the compressive device.

Finally, a plurality of compressive devices may be linked to achieve even higher COPs. This would enable greater temperature ranges to be achieved or a reduction in the necessary driving temperature. It would not be necessary for the individual compressive devices of such a linked system to be rotating at the same speed or to be using the same sorbent material and refrigerant. The sub-assemblies could be radially or axially displaced. In a further alternative a plurality of rows of vessels at different radii may be employed whilst still maintaining the counterflow of the carrier fluid.

What is claimed is:

1. A compressive device comprising: a plurality of sorbent vessels each vessel containing a sorbent material and a sorbate fluid; at least one fluid conduit in which at least a portion of each of the plurality of sorbent vessels is located and in which a heat carrier fluid flows, the conduit having an inlet and an outlet; and driving means for causing relative cyclical movement of the sorbent vessels with respect to the conduit inlet position, thereby establishing a direction of vessel relative motion, such that the heat carrier fluid is predominantly in counterflow with respect to the sorbent vessels and such that bulk fluid relative motion is maintained from one sorbent vessel towards its nearest neighbor in a direction opposite to that of vessel relative motion.

2. A compressive device as claimed in claim 1, wherein the conduit is stationary and the driving means is connected to the plurality of sorbent vessels.

3. A compressive device as claimed in claim 2, wherein the conduit is in the form of an extruded annulus within which the sorbent vessels move with the axis of the sorbent vessels aligned with the central axis of the annulus.

4. A compressive device as claimed in claim 3, wherein the sorbent vessels are mounted about an edge region of a rotating disc and wherein the rotating disc forms a sliding fluid seal with respect to the conduit.

5. A compressive device as claimed in claim 1, further including a heating device for heating the heat carrier fluid at an intermediate position between the inlet and the outlet to the conduit.

6. A compressive device as claimed in claim 5, wherein the heating device is positioned away from the conduit and a passageway fluidly connects the conduit to the heating device.

7. A compressive device as claimed in claim 5, wherein the heating device consists of a valve for the introduction of a heated fluid, additional to the heat carrier fluid, into the conduit.

8. A compressive device as claimed in claim 1, wherein a fluid seal is provided in the conduit between the inlet and the outlet to restrict the flow of the heat carrier fluid in one direction through the conduit.

9. A compressive device as claimed in claim 8, wherein the fluid seal consists of a plurality of vanes connected to a rotating axle wherein the end of each vane, distant from the axle, forms a sliding fluid seal with respect the conduit.

10. A compressive device as claimed in claim 1, wherein a plurality of heating/cooling channels are provided and each of the sorbent vessels has a second portion, distant from the first portion, and said driving means causes relative, cyclical movement of the second portions of the sorbent vessels with respect to the heating/cooling channels.

11. A compressive device as claimed in claim 10, wherein the heating/cooling channels are arranged to produce a flow of fluid over the second portions of each of the sorbent vessels.

12. A compressive device as claimed in claim 1, wherein a fluid seal is provided between the conduit and the heating/cooling channels.

13. A compressive device as claimed in claim 1 wherein the compressive device is part of a refrigerator.

14. A compressive device as claimed in claim 1 wherein the compressive device is part of a heat pump.

15. A compressive device as claimed in claim 1 wherein the compressive device is part of an air conditioning system.

16. A compressive device as claimed in claim 1 wherein the compressive device is part of a thermal transformer.

17. A compressive device comprising: a plurality of sorbent vessels each vessel containing a sorbent material defining a sorbent-rich region and a sorbate fluid wherein the sorbent-rich region is in fluid communication with a sorbate fluid reservoir via a substantially adiabatic intermediate region; at least one fluid conduit in which at least a portion of the sorbent-rich region of each of the plurality of sorbent vessels is located and in which a heat carrier fluid flows, the conduit having an inlet and an outlet; and driving means for causing relative cyclical movement of the sorbent vessels with respect to the conduit inlet position such that the heat carrier fluid is predominantly in counterflow with respect to the sorbent vessels.

18. A compressive device according to claim 17 in which each sorbate vessel has its own respective sorbate fluid reservoir and intermediate adiabatic region.

19. A compressive device according to claim 18 in which the adiabatic intermediate region comprises a restriction of vessel cross-sectional area.

20. A compressive device according to claim 19 in which the adiabatic intermediate region comprises an internal vessel wall lining of a chemically inert material.

21. A compressive device as claimed in claim 17, wherein the at least one sorbent vessel is in fluid communication with a condenser and an evaporator that are separate from the at least one vessel.

22. A compressive device as claimed in claim 21, having a plurality of sorbent vessels wherein the condenser and the evaporator are common to the plurality of vessels.

* * * * *